US012215639B1

(12) United States Patent
Svensson et al.

(10) Patent No.: US 12,215,639 B1
(45) Date of Patent: Feb. 4, 2025

(54) DUAL FUEL OPERATING STRATEGY FOR ENGINE BASED ON EXPECTED IN-CYLINDER TEMPERATURE PROGRESSION

(71) Applicant: Caterpillar Inc., Peoria, IL (US)

(72) Inventors: Kenth I. Svensson, Peoria, IL (US); Jonathan W. Anders, Peoria, IL (US); Yongli Qi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/513,760

(22) Filed: Nov. 20, 2023

(51) Int. Cl.
*F02D 19/06* (2006.01)
*F02D 13/02* (2006.01)
*F02D 41/00* (2006.01)

(52) U.S. Cl.
CPC ..... *F02D 19/0602* (2013.01); *F02D 13/0242* (2013.01); *F02D 19/0689* (2013.01); *F02D 41/0002* (2013.01); *F02D 41/009* (2013.01); *F02D 2041/001* (2013.01); *F02D 2200/023* (2013.01); *F02D 2200/024* (2013.01)

(58) Field of Classification Search
CPC ............ F02D 19/0602; F02D 19/0689; F02D 13/0242; F02D 41/0002; F02D 41/009; F02D 2041/001; F02D 2200/003; F02D 2200/024
See application file for complete search history.

(56) References Cited

U.S. PATENT DOCUMENTS

| | | | |
|---|---|---|---|
| 6,947,830 B1* | 9/2005 | Froloff ................ | F02D 41/3076 701/111 |
| 9,109,498 B2 | 8/2015 | Bradley et al. | |
| 9,903,284 B1* | 2/2018 | Lavertu .................. | F02D 41/38 |
| 10,323,586 B1* | 6/2019 | Atterberry ............ | F02D 19/081 |
| 11,143,137 B1* | 10/2021 | Kim ..................... | F02D 13/0234 |
| 11,261,806 B1* | 3/2022 | McConville ........ | F02D 13/0265 |
| 2015/0192497 A1* | 7/2015 | Gregory ................ | F02D 35/023 73/114.08 |
| 2020/0263627 A1* | 8/2020 | Anders ................. | F02D 35/028 |
| 2020/0271068 A1* | 8/2020 | Dodis ..................... | F02D 41/20 |

(Continued)

FOREIGN PATENT DOCUMENTS

CN 102080598 B 6/2012
CN 212318179 U 1/2021

(Continued)

*Primary Examiner* — Grant Moubry
(74) *Attorney, Agent, or Firm* — Brannon Sowers & Cracraft PC

(57) ABSTRACT

Operating an engine system includes calculating a crank angle timing term corresponding to an in-cylinder temperature sufficient for autoignition of a first fuel injected at a first injection location. Operating an engine system further includes calculating, based on the crank angle timing term, at least one of an injection amount or an injection duration, to increase the in-cylinder temperature sufficiently via burning of the first fuel to ignite a second fuel injected into a mixture of the first fuel and pressurized intake air. The first fuel may include a blend of dimethyl ether (DME), methanol (MeOH), and water. Based on expected progression of in-cylinder temperatures, and fuel injection amount and/or duration based thereon, desirable controllability of combustion phasing and/or other combustion properties may be realized.

20 Claims, 3 Drawing Sheets

(56) References Cited

U.S. PATENT DOCUMENTS

2020/0277925 A1\* 9/2020 John .................. F02D 13/0238
2020/0318570 A1\* 10/2020 Hampson .............. F02D 35/028

FOREIGN PATENT DOCUMENTS

| | | |
|---|---|---|
| CN | 216111004 U | 3/2022 |
| GB | 2529399 B | 3/2019 |
| JP | 4749161 B2 | 8/2011 |
| WO | 2015058241 A1 | 4/2015 |
| WO | 2023200588 A1 | 10/2023 |

\* cited by examiner

DUAL FUEL OPERATING STRATEGY FOR ENGINE BASED ON EXPECTED IN-CYLINDER TEMPERATURE PROGRESSION

FEDERALLY SPONSORED RESEARCH OR DEVELOPMENT

This invention was made with government support under Umbrella CRADA SC16/01875.00.00. The government has certain rights in the invention.

TECHNICAL FIELD

The present disclosure relates generally to operating an engine system on dual fuels, and more particularly to at least one of an injection amount or a duration of an earlier injected fuel being based on an expected progression of in-cylinder temperature.

BACKGROUND

Internal combustion engine systems are used the world over for production of electrical power, pressurization and/or transport of liquids and gases, and of course vehicle propulsion. Internal combustion engines employ a well-known process of igniting a fuel and air in an engine cylinder to produce a rapid pressure and temperature rise that drives a piston coupled to a rotatable crankshaft. In recent years, increasingly stringent emissions standards have motivated research and development in alternatives to traditional fossil fuels. So-called alternative fuels theoretically produce reduced levels of certain undesired emissions including oxides of nitrogen, particulate matter, and greenhouse gases at least under certain conditions.

A well-known platform that has experienced considerable technical and commercial success is a dual fuel engine, typically employing a relatively small quantity of a first fuel to ignite a larger quantity of a main fuel. A classic example of a dual fuel engine employs a small pilot injection of diesel fuel directly into a cylinder where the diesel autoignites to trigger ignition of a main charge of a gaseous fuel such as natural gas. In an effort to further improve upon traditional dual fuel strategies, engineering efforts have accelerated in relation to alternative fuels such as alcohol fuels, hydrogen, ether, and still others.

While many engine platforms can theoretically operate on various different fuel types, even seemingly minor changes to fuel composition can radically alter the necessary controls, timing of engine operating events, and even optimal engine hardware that is needed to comply with applicable standards for emissions, efficiency, and certainly cost. International patent application publication WO 2023200588A1 to Schroeder et al. is directed to a compression-ignited dual liquid fuel system and control strategy for flexible fuel operation.

SUMMARY

In one aspect, a method of operating an engine system includes injecting a first fuel in a first fuel injection at a first injection location of an engine system into a feed of pressurized intake air, and injecting a second fuel in a second fuel injection at a second injection location of the engine system into a mixture of the first fuel and the pressurized intake air. The method further includes calculating a crank angle timing term corresponding to an in-cylinder temperature sufficient for autoignition of the first fuel, and calculating, based on the crank angle timing term, at least one of an injection amount or an injection duration of the first fuel injection, to increase the in-cylinder temperature sufficiently via burning of the first fuel to ignite the second fuel. The method still further includes combusting the first fuel and the second fuel in a combustion cylinder in the engine system in an engine cycle.

In another aspect, an engine system includes an engine having therein a combustion cylinder, and an intake port extending to the combustion cylinder. The engine system further includes a fuel system having a first fuel supply of a first fuel, a first fuel injector fluidly connected to the first fuel supply, a second fuel supply of a second fuel, a second fuel injector fluidly connected to the second fuel supply, and a fueling control unit. The fueling control unit is structured to output a first fueling command to the first fuel injector to inject the first fuel into a stream of pressurized intake air fed through the intake port, and to output a second fueling command to the second fuel injector to inject the second fuel directly into the combustion cylinder. The fueling control unit is further structured to determine, via the first fueling command, at least one of an injection amount or an injection duration of the first fuel based on an expected progression of in-cylinder temperature in an engine cycle from an autoignition temperature of the first fuel to an ignition temperature of the second fuel.

In still another aspect, a fuel system for an engine system includes a fueling control unit structured to output a first fueling command to a first fuel injector at a first injection location of the engine system to inject a first fuel into a stream of pressurized intake air fed through an intake port to a combustion cylinder. The fueling control unit is further structured to output a second fueling command to a second fuel injector at a second injection location of the engine system to inject a second fuel into a mixture of the pressurized intake air and the first fuel in the combustion cylinder. The fueling control unit is further structured to determine, via the first fueling command, at least one of an injection amount or an injection duration of the first fuel based on an expected progression of in-cylinder temperature from an autoignition temperature of the first fuel to an ignition temperature of the second fuel.

DETAILED DESCRIPTION

Figure 1:
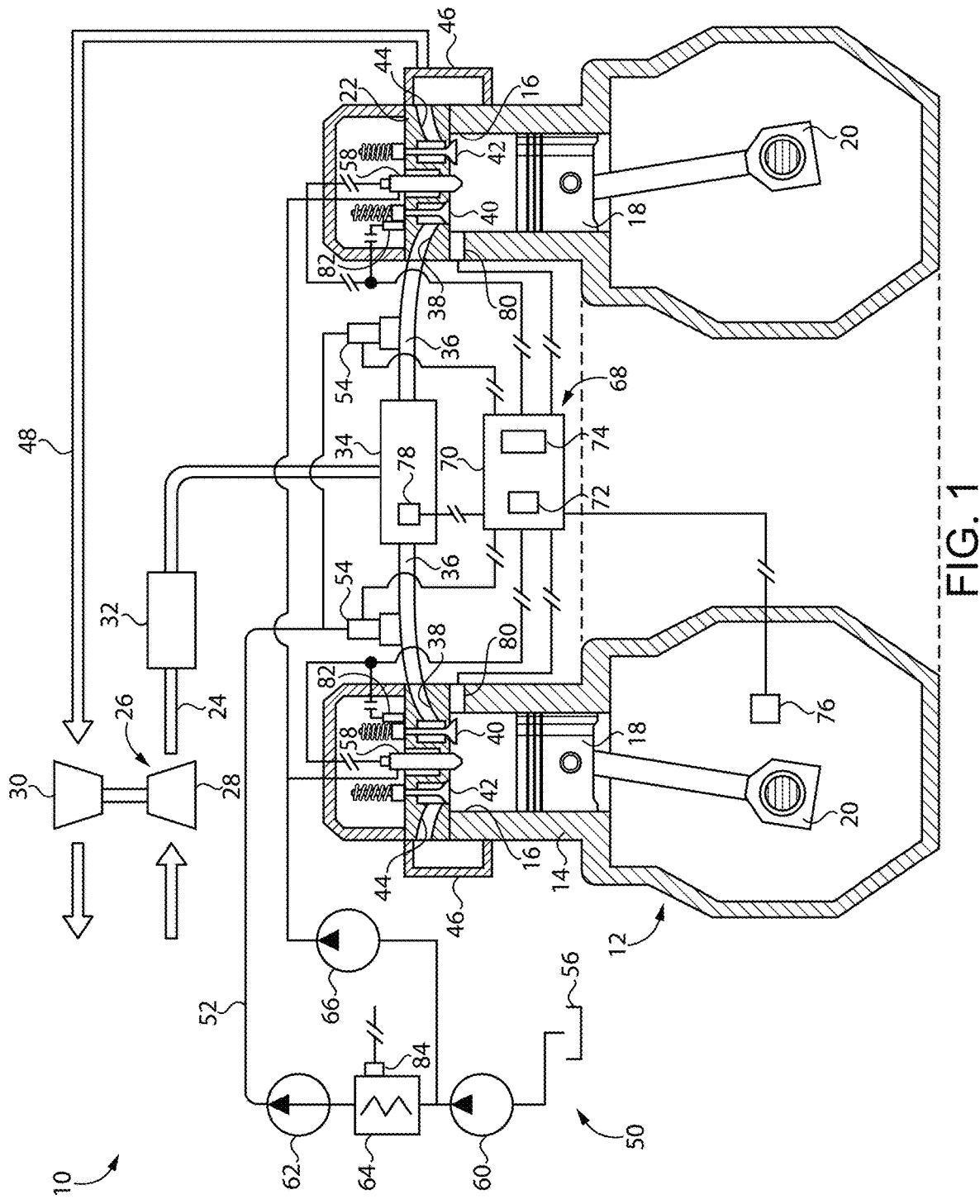
FIG. 1 is a diagrammatic view of an engine system, according to one embodiment.

Referring to FIG. 1, there is shown a dual fuel internal combustion engine system 10, according to one embodiment. Engine system 10 includes an engine 12 having an engine housing 14 with a plurality of combustion cylinders 16 formed therein. A plurality of pistons 18 are positioned in cylinders 16 and each is movable between a top-dead-center position and a bottom-dead-center position in a generally conventional manner. Engine 12 is typically operated in a 4-stroke engine cycle although the present disclosure is not thereby limited. Pistons 18 are coupled to a crankshaft 20 that is rotated to operate a load such as an electrical generator, a compressor, a pump, or a driveline in a vehicle to name a few examples. Cylinders 16 may be of any number in any suitable arrangement such as a V-pattern, an in-line pattern, or still another. An engine head 22 is attached to engine housing 14.

Engine system 10 also includes an intake conduit 24 supplying intake air to a compressor 28 in a turbocharger 26. The intake air is pressurized by way of compressor 28 and fed through an aftercooler 32 to an intake manifold 34. A plurality of intake runners 36 extend from intake manifold 34 to engine head 22. Exhaust from combustion of fuel in cylinders 16 is fed by way of an exhaust manifold 46 to an exhaust conduit 48 and through a turbine 30 of turbocharger 26, again in a generally conventional manner. A plurality of intake valves 40 are supported in engine head 22 and each is movable to open and close fluid communication between an intake port 38 extending through engine head 22 and each respective combustion cylinder 16. A plurality of exhaust valves 42 are also supported in engine head 22 and each is movable to open and close fluid communication between one combustion cylinder 16 and exhaust manifold 46 by way of exhaust ports 44. Although the present disclosure is not thereby limited, each combustion cylinder 16 may be associated with a total of two intake valves 40 and a total of two exhaust valves 42.

Engine system 10 also includes a fuel system 50. Fuel system 50 includes a first fuel supply 52 of a first fuel, and a plurality of first fuel injectors 54 each positioned at a first fuel injection location of engine system 10 and fluidly connected to first fuel supply 52. Each first fuel injector 54 referred to herein, at times, in the singular, may be arranged as a port fuel injector, such that the first injection location is a port fuel injection location. First fuel injector 54 may be positioned to inject the first fuel directly into, or close to and just upstream of, the respective intake port 38. Fuel system 50 also includes a second fuel supply 56 of a second fuel, and a plurality of second fuel injectors 58 each positioned at a second fuel injection location of engine system 10 and fluidly connected to second fuel supply 56. Each second fuel injector 58, also referred to herein, at times, in the singular, may be arranged as a direct fuel injector. The first fuel may be injected into a stream of pressurized intake air fed through intake port 38. "Fed through" intake port 38 means to be fed or having been partially fed. The second fuel injection location includes a direct injection location, such that the second fuel is directly injected into a mixture of the first fuel and pressurized intake air in the respective combustion cylinder 16.

In the illustrated embodiment, first fuel supply 52 is illustrated as a fuel conduit. Thus, the fuel conduit supplies the first fuel. In various implementations, first fuel supply 52 may include not only a fuel conduit but also an accumulator or other storage volume of the first fuel that is not explicitly shown in FIG. 1. Fuel system 50 also includes a fuel pump 60 structured to transfer the second fuel to a high-pressure pump 66 that pressurizes the second fuel to an injection pressure and feeds the same to second fuel injectors 58. Fuel pump 60 also feeds the second fuel to a reactor 64 wherein the second fuel is transformed into the first fuel. Reactor 64 may include appropriate hardware such as a heating element (not numbered) for the transformation of the second fuel into the first fuel. In an embodiment, the first fuel includes an ether, such as dimethyl ether or DME, and the second fuel includes an alcohol fuel, such as methanol or MeOH. Reactor 64 can transform a blend of MeOH and water from second fuel supply 56 by way of a well-known alcohol dehydration process to provide a feed of a fuel blend of DME, MeOH, and water to another fuel pump 62 that pressurizes the fuel blend to an injection pressure for supplying to first fuel injectors 54 from first fuel supply 52. Thus, the first fuel may include a fuel blend of DME, MeOH, and water, and the second fuel may include a blend of MeOH and water. Other fuel blends and compositions are nevertheless within the scope of the present disclosure. Moreover, in some implementations the first fuel is not derived from the second fuel at least on-board engine system 10, and the two fuels are independently stored and supplied. The present disclosure is applicable without limitation to the plumbing arrangement, number of fuel storage volumes, number of pumps, valves, or other components in fuel system 50, or processes for making or blending fuels, so long as a supply of two suitable fuels can be provided.

Engine system 10 further includes a control system 68. Control system 68 includes an electronic control unit or fueling control unit 70 having a processor 72 and a computer readable memory 74. Processor 72 can include any suitable programmable logic unit, such as a microprocessor or a microcontroller, that is, or includes, a central processing unit (CPU). Memory 74 includes any suitable volatile or non-volatile computer readable memory such as RAM, ROM, FLASH, a hard drive, or still another. Memory 74 stores computer executable instructions to be executed by processor 72, as well as maps, tables, or other data structures, to carry out the features and functions of the present disclosure. Fueling control unit 70 could include one processor and one memory, and/or multiple processors and/or multiple memories without limitation. Control system 68 may also include an engine timing sensor 76 coupled to fueling control unit 70, such as an engine crank angle timing sensor structured to output an engine timing signal. Control system 68 also includes at least one intake manifold sensor 78 structured to monitor intake manifold pressure or IMAP and intake manifold temperature or IMAT and output corresponding signals to fueling control unit 70. A cylinder pressure sensor is shown at numeral 80. Control system 68 may also include at least one reactor sensor 84 structured to monitor a reactor temperature and a reactor pressure of reactor 64. Control system 68 also includes a plurality of variable valve actuators 82 each coupled to one of intake valves 40 to vary an intake valve closing timing as further discussed herein.

Fueling control unit 70 is in control communication with first fuel injector 54 and second fuel injector 58, with first fuel injector 54 and second fuel injector 58 being electrically actuated so as to open and close in response to electrical control currents in a manner that will be familiar to those skilled in the art. During at least one mode of operation of engine system 10 a relatively small amount of the first fuel, a fuel blend containing DME, MeOH, and water, for example, is port injected by way of first fuel injector 54 into a stream of pressurized intake air fed through intake port 38. Fueling control unit 70 may be structured to output a first fueling command to first fuel injector 54 to inject the first fuel into the stream of pressurized intake air. Fueling control unit 70 may be further structured to output a second fueling command to direct fuel injector 58 to inject the second fuel directly into the respective combustion cylinder 16 and into a mixture of the first fuel and pressurized intake air therein.

Fueling control unit 70 may be further structured to determine, by way of the first fueling command, at least one of an injection amount or an injection duration of the first fuel based on an expected progression of in-cylinder temperature in an engine cycle. The expected progression of in-cylinder temperature may include an increase in in-cylinder temperature from a first temperature sufficient for autoignition of the first fuel to a second temperature sufficient to ignite the second fuel. The first temperature may be an autoignition temperature of the first fuel, or an autoignition temperature of a constituent of the first fuel where provided as a fuel blend. The second temperature may be an autoignition temperature of the second fuel, or an autoignition temperature of a constituent of the second fuel where provided as a fuel blend.

The described determining, via the first fueling command, at least one of an injection amount or an injection duration of the first fuel, means establishing or causing the at least one of an injection amount or an injection duration. Put differently, in calculating the outputted first fueling command, the injection amount or injection duration, and commonly both, of the first fuel is caused to occur by way of the first fueling command, such as by way of a duration and/or an amplitude of an electrical control current to first fuel injector 54. These concepts will be further understood in view of the following description of additional figures.

Figure 2:
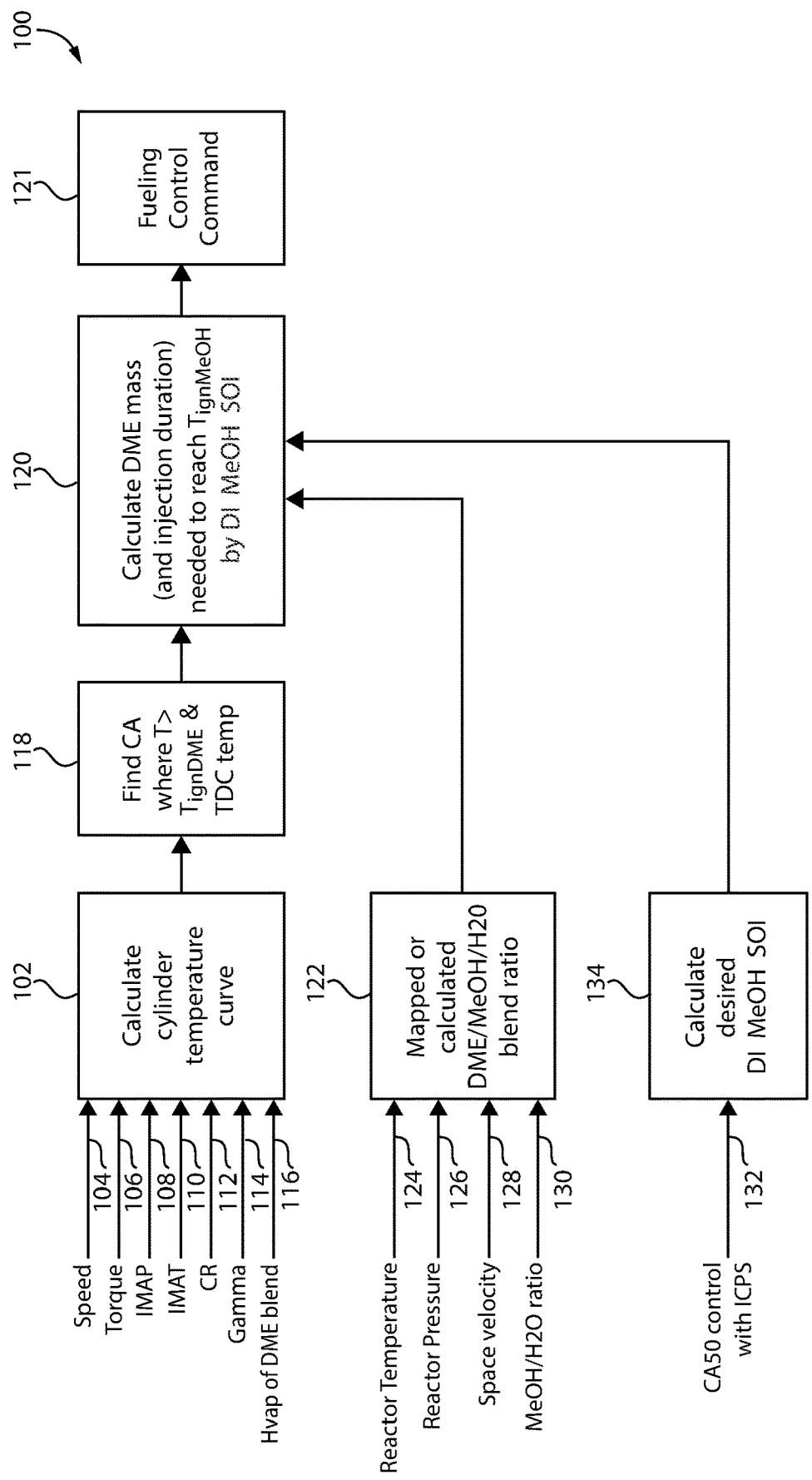
FIG. 2 is a computational block diagram of an engine operating strategy, according to one embodiment.

Referring also now to FIG. 2, there is shown a diagram 100 illustrating example calculations and/or determinations and/or map lookups that may be performed on fueling control unit 70. At a block 102, fueling control unit 70 calculates a cylinder temperature curve. It will be recalled that at least one of an injection amount or an injection duration of the first fuel in a first fuel injection at the first fuel injection location may be based on an expected progression of in-cylinder temperature. In the embodiment of FIG. 2 the calculated cylinder temperature curve defines an expected progression of in-cylinder temperature. A cylinder temperature curve as contemplated herein includes at least two points on a curve relating cylinder temperature to crank angle timing, and typically more than two points. The calculation of the cylinder temperature curve may be based on an engine speed input 104, an engine torque input 106, an intake manifold air pressure (IMAP) input 108, an intake manifold air temperature (IMAT) input 110, a compression ratio (CR) input 112, a Gamma input 114 and a heat of vaporization (Hvap) of DME blend (the first fuel) input 116. Gamma may be a specific heat ratio for the constituents of the mixture of gases combusted and is a well-known variable in the combustion science arts. In an embodiment, the cylinder temperature curve can be calculated according to the following Equation 1:

$$\frac{T2}{T1} = \left(\frac{V2}{V1}\right)^{(n-1)}$$

Where: T1=first in-cylinder temperature;
T2=second in-cylinder temperature;
V1=first in-cylinder volume;
V2=second in-cylinder volume; and
n=Gamma.

Figure 3:
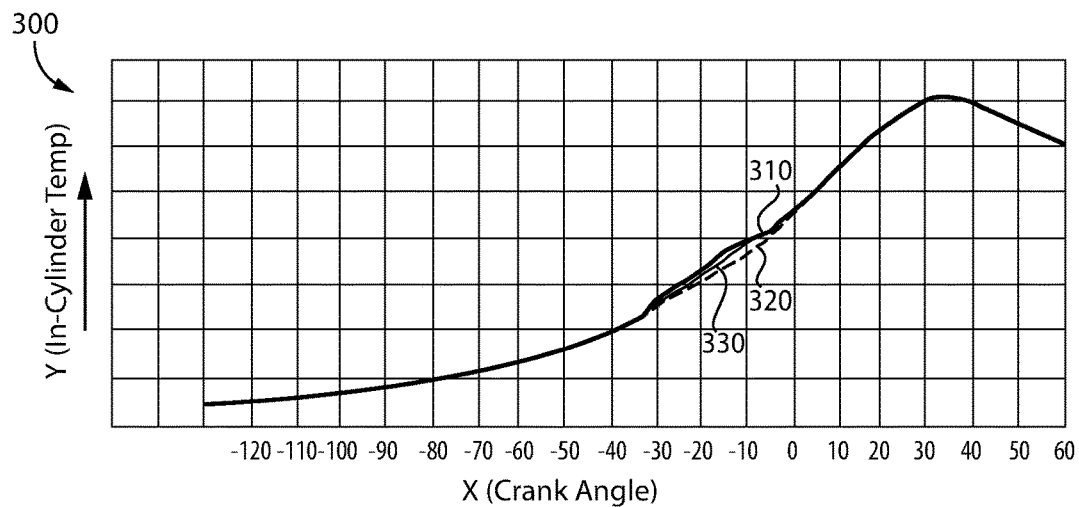
FIG. 3 is a graph illustrating a cylinder temperature curves using different fuel blend ratios, according to one embodiment.

Referring briefly to FIG. 3, there is shown a graph 300 illustrating cylinder temperature curves that might be observed for different fuels and fuel blends varying relative proportions of MeOH, DME, and water. Graph 300 includes a first curve 310 where substantially pure or neat DME is used as the first fuel. A second curve 320 corresponds to a fuel blend of MeOH:DME:H2O=0.40:0.75:0.05 by mass. A third curve 330 corresponds to a fuel blend of MeOH:DME:H2O=0.12:0.85:0.03 by mass. FIG. 3 shows variation in the cylinder temperature curves that might be observed with different fuel blends forming the first fuel. As further discussed herein, determining at least one of injection amount or duration of the first fuel can vary in different cases based upon the varied expectations in the progression of cylinder temperature as illustrated by way of example in FIG. 3.

Certain of the inputs to block 102 may be determined from sensor signals in control system 68, and others can be read from stored values as will be apparent to those skilled in the art. At a block 118, based upon the cylinder temperature curve, fueling control unit 70 determines a crank angle (CA) where an in-cylinder temperature is equal to or greater than an autoignition temperature of the DME ($T_{ignDME}$), and also determines a top-dead center (TDC) cylinder temperature. Thus, determining the cylinder temperature curve, including at least two points on the cylinder temperature curve, enables fueling control unit 70 to determine a crank angle where the in-cylinder temperature is expected to be at or above a temperature at which the injected fuel blend of the first fuel autoignites. At block 118 fueling control unit 70 can be understood to calculate a crank angle timing term including, for example a crank angle degree term or a numerical term indicative thereof, corresponding to the expected in-cylinder temperature sufficient for autoignition of the first fuel. In an example, the determined crank angle timing term at block 118 might be a numerical term corresponding precisely to the crank angle, within measurement error or tolerance and accounting for any expected injection delay, at which the first fuel is expected to autoignite.

At a block 120, fueling control unit 70 calculates a first fuel mass (DME mass) and an injection duration needed to reach an in-cylinder temperature ($T_{ignMeoH}$) sufficient to ignite the second fuel. It is contemplated the calculated mass may include a mass needed to reach $T_{ignMeoH}$ via increasing the in-cylinder temperature sufficiently via burning of the first fuel to ignite the second fuel at a desired start of direct injection timing of the second fuel (DI MeOH SOI). In one embodiment, $T_{ignDME}$ may be approximately 780 Kelvin, and $T_{ignMeoH}$ may be approximately 1080 Kelvin. These exact temperatures may vary, however, as they are calculated values that can depend upon other parameters. As an example, $T_{ignDME}$ might be determined from a map that accounts for effects of the DME blend mixture effects on the precise temperature at which the DME autoignites. It should also be appreciated that the calculation at block 120 may generate a mass value of the fuel blend comprising the first fuel that is different from, but directly or indirectly indicative of, a mass of DME that is needed.

The calculations described above demonstrate that a relative amount of energy, expressed as a mass of fuel, that is needed to raise cylinder temperature via burning the first fuel to ignite the second fuel can be determined. This strategy enables only so much fuel (DME) as is needed to be injected in the first fuel injection to ignite the larger, second fuel injection. In an embodiment, the DME may account for approximately 5% or less of a total energy of fuel burned in an engine cycle at full load, with the balance from MeOH. As load is decreased, an amount of DME may remain substantially the same by mass but will increase as a proportion of the total energy of fuel burned in an engine cycle.

Since a blend ratio of the first fuel might vary during service, for example, based upon operation and performance of reactor 64, from variations in the second fuel from which the first fuel is derived, or from variations introduced when a stored volume of the first fuel is refilled, the energy content of the first fuel may also vary. Accordingly, at a block 122 fueling control unit 70 can determine by way of a calculation or a map lookup a blend ratio of the first fuel including, for example, a DME/MeOH/H2O blend ratio. As shown in FIG. 2 inputs to block 122 can include a reactor temperature input 124, a reactor pressure input 126, a space velocity input 128, and an MeOH/H2O ratio input 130. The MeOH/H2O ratio might be a ratio of a MeOH and water blend in fuel supply 56. The results of the calculation of block 122 are used in the calculation of a mass value performed at block 120.

At a block 134 fueling control unit 70 calculates a desired direct injection MeOH start of injection (DI MeOH SOI). In an embodiment, a start of injection timing of MeOH may be based on a target fuel burned amount at a given crank angle. An input 132 to block 134 includes crank angle 50% burned control with in-cylinder pressure sensing (CA50 control with ICPS). Thus, the start of injection timing of the MeOH can be calculated based on at what crank angle it is desired to have burned 50% of the total injected fuel. Other strategies for determining a desired start of injection timing could be used. The results of the calculation at block 134 can be fed to block 120.

With the mass and injection duration of the first fuel injection expected to ignite the second fuel of the second fuel injection at the desired start of injection timing calculated at block 120, a fueling control command 121 can be outputted to first fuel injector 54. Fueling control unit 70 can then output a second fueling control command to second fuel injector 58 to inject the second fuel directly into the corresponding combustion cylinder 16, and the injected first fuel and second fuel both combusted in an engine cycle.

The presently described process steps shown by way of example in FIG. 2 demonstrate that just the right amount of the first fuel as is necessary to ignite the second fuel at a desired timing can be determined. In some embodiments, a phasing of combustion of fuels combusted in engine system 10 can be controlled from engine cycle to engine cycle using additional controls. As reflected in FIG. 2, the desired start of injection timing can be calculated based upon a desired fuel burned amount at a predetermined crank angle. In-cylinder pressure sensing can indicate a heat release rate during combustion, providing feedback that can be used to vary the phasing of combustion. Using in-cylinder pressure sensing, misfire might also be detected and an increased amount of DME injected. In one embodiment, cylinder pressure will be monitored in an engine cycle, and fueling control unit 70 can control the phasing of combustion in a subsequent engine cycle via varying at least one of, an intake valve closing timing or an IMAP in a subsequent engine cycle. Delaying intake valve closing to an adjustable relative degree past a bottom-dead-center position of a piston in an engine cycle and/or varying a relative amount of pressurized intake air that is bled off before reaching engine 12 can be used to shift combusting phasing earlier or later, for example. In one aspect, the present disclosure can be understood to enable a start of injection timing to reliably and predictably occur at a desired timing, or within a desired timing range, expanding and improving the applicability of other controls that can be targeted at combustion phasing.

INDUSTRIAL APPLICABILITY

Figure 4:
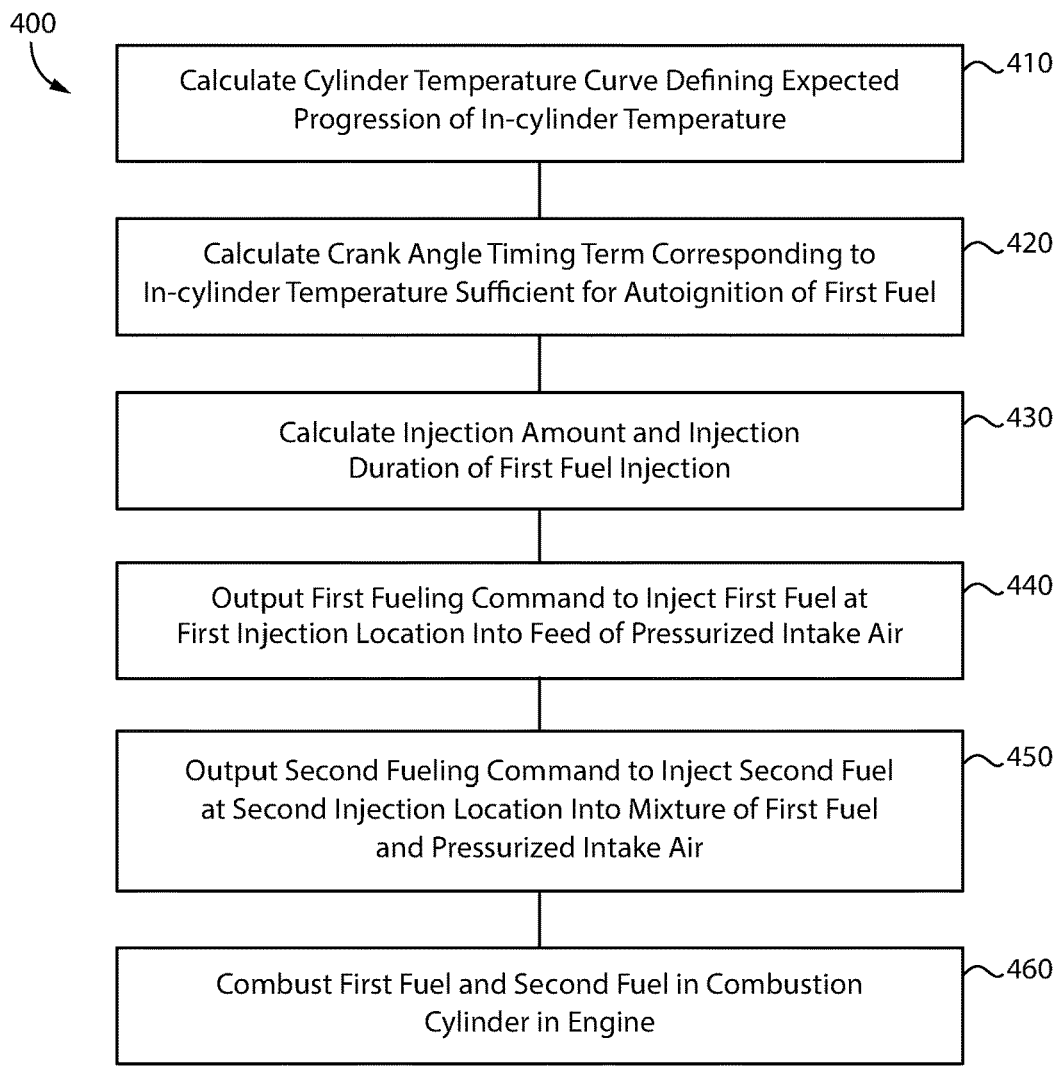
FIG. 4 is a flowchart illustrating example methodology and logic flow, according to one embodiment.

Still referring to the drawings generally, but also now to FIG. 4, there is shown a flowchart 400 illustrating example methodology and logic flow according to one embodiment. In flowchart 400, at a block 410 a cylinder temperature curve defining expected progression of in-cylinder temperature is calculated. From block 410, flowchart 400 advances to a block 420 to calculate a crank angle timing term corresponding to an in-cylinder temperature sufficient for autoignition of the first fuel, and then to a block 430 to calculate an injection amount and an injection duration of the first fuel injection.

From block 430 flowchart 400 advances to a block 440 to output a first fueling command to inject the first fuel at the first injection location into a feed of pressurized intake air. From block 440 flowchart 400 advances to a block 450 to output a second fueling command to inject the second fuel at the second injection location into a mixture of the first fuel and pressurized intake air. From block 450 flowchart 400 advances to a block 460 to combust the first fuel and the second fuel in a combustion cylinder in the engine.

Engine system 10 may be sold as original equipment configured to operate according to the present disclosure on two fuels, such as a fuel blend containing DME, MeOH, and water, and a second fuel containing MeOH and water. As discussed herein system arrangements are contemplated where the first fuel is derived from the second fuel on-board. In other instances, fuel tanks containing the two fuels separately might be employed. Other implementations include an add-on fuel system and/or control system that can be retrofitted to an existing engine platform. Still other combinations and variations will be apparent to those skilled in the art.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine system comprising:
    injecting a first fuel in a first fuel injection at a first injection location of an engine system into a feed of pressurized intake air;
    injecting a second fuel in a second fuel injection at a second injection location of the engine system into a mixture of the first fuel and the pressurized intake air;
    calculating a crank angle timing term corresponding to an in-cylinder temperature sufficient for autoignition of the first fuel;
    calculating, based on the crank angle timing term, at least one of an injection amount or an injection duration of the first fuel injection, to increase the in-cylinder temperature sufficiently via burning of the first fuel to ignite the second fuel; and
    combusting the first fuel and the second fuel in a combustion cylinder in the engine system in an engine cycle.

2. The method of claim 1 wherein the first fuel includes a fuel blend, and the calculating at least one of an injection amount or an injection duration includes calculating a mass value of the fuel blend to be injected and an injection duration of the first fuel injection.

3. The method of claim 2 wherein the fuel blend contains an ether and an alcohol.

4. The method of claim 3 wherein the fuel blend contains dimethyl ether (DME), methanol (MeOH) and water.

5. The method of claim 1 wherein the second fuel includes methanol (MeOH).

6. The method of claim 5 further comprising determining a start of injection timing of the MeOH based on a target fuel burned amount at a predetermined crank angle timing.

7. The method of claim 6 further comprising:
monitoring an in-cylinder pressure in the engine cycle; and
controlling a phasing of combustion in a subsequent engine cycle via varying at least one of an intake valve closing timing or an intake manifold pressure (TMAP), based on the monitored in-cylinder pressure.

8. The method of claim 1 wherein the calculating the crank angle timing term is based on a cylinder temperature curve.

9. The method of claim 8 further comprising calculating the cylinder temperature curve based upon a specific heat ratio.

10. The method of claim 1 wherein the first fuel injection location includes a port injection location, and the second fuel injection location includes a direct injection location.

11. An engine system comprising:
an engine including therein a combustion cylinder, and an intake port extending to the combustion cylinder;
a fuel system including a first fuel supply of a first fuel, a first fuel injector fluidly connected to the first fuel supply, a second fuel supply of a second fuel, a second fuel injector fluidly connected to the second fuel supply, and a fueling control unit;
the fueling control unit being structured to:
output a first fueling command to the first fuel injector to inject the first fuel into a stream of pressurized intake air fed through the intake port;
output a second fueling command to the second fuel injector to inject the second fuel directly into the combustion cylinder; and
determine, via the first fueling command, at least one of an injection amount or an injection duration of the first fuel based on an expected progression of in-cylinder temperature in an engine cycle from an autoignition temperature of the first fuel to an ignition temperature of the second fuel.

12. The engine system of claim 11 wherein the first fuel includes a fuel blend, and the fueling control unit is further structured to calculate a mass value of the fuel blend to be injected, and wherein the determined at least one of an injection amount or an injection duration is based on the calculated mass value.

13. The engine system of claim 12 wherein the fuel blend includes an ether, and the autoignition temperature of the first fuel includes an autoignition temperature of the ether.

14. The engine system of claim 11 wherein the ignition temperature of the second fuel includes an in-cylinder temperature occurring at a desired start of injection (SOI) crank angle timing for the injection of the second fuel.

15. The engine system of claim 11 wherein the fueling control unit is further structured to calculate a cylinder temperature curve defining the expected progression of in-cylinder temperature.

16. The engine system of claim 11 wherein the fueling control unit is further structured to monitor in-cylinder pressure of the combustion cylinder, and to control a phasing of combustion in the combustion cylinder in a subsequent engine cycle via varying at least one of an intake valve closing timing or an intake manifold pressure (IMAP), based on the monitored in-cylinder pressure.

17. A fuel system for an engine system comprising:
a fueling control unit structured to:
output a first fueling command to a first fuel injector at a first injection location of the engine system to inject a first fuel into a stream of pressurized intake air fed through an intake port to a combustion cylinder;
output a second fueling command to a second fuel injector at a second injection location of the engine system to inject a second fuel into a mixture of the pressurized intake air and the first fuel in the combustion cylinder; and
determine, via the first fueling command, at least one of an injection amount or an injection duration of the first fuel based on an expected progression of in-cylinder temperature from an autoignition temperature of the first fuel to an ignition temperature of the second fuel.

18. The fuel system of claim 17 wherein the first fuel includes a fuel blend, and the fueling control unit is further structured to calculate a mass value of the fuel blend to be injected, and wherein the determined at least one of an injection amount or an injection duration is based on the calculated mass value.

19. The fuel system of claim 18 wherein the calculated mass value is indicative of a mass of ether in the fuel blend.

20. The fuel system of claim 19 wherein the fueling control unit is further structured to calculate a cylinder temperature curve defining the expected progression of in-cylinder temperature based upon a specific heat ratio of the fuel blend containing dimethyl ether (DME) and methanol (MeOH).

\* \* \* \* \*